April 2, 1957 T. J. ETHIER ET AL 2,787,720
COOLING OF ELECTRIC MACHINES
Filed April 26, 1955 2 Sheets-Sheet 2
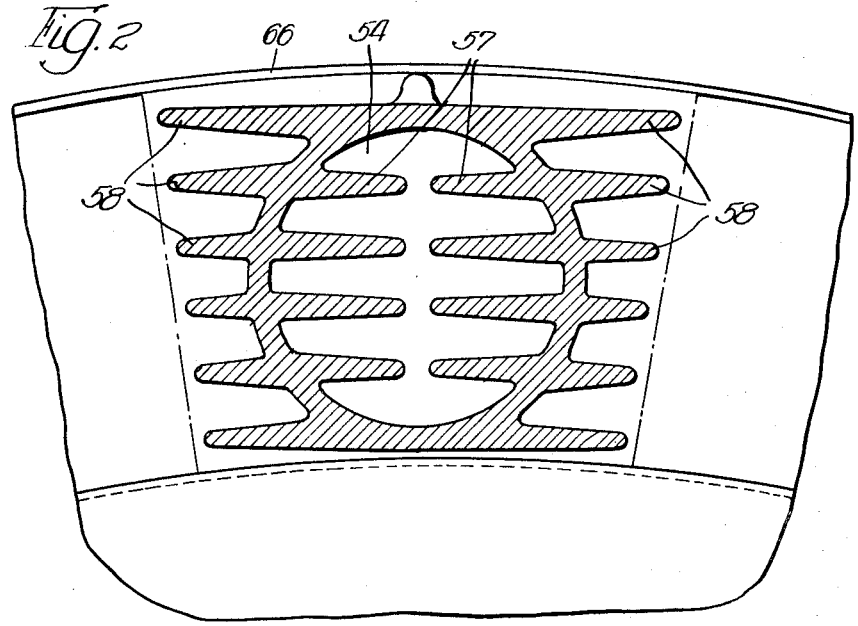
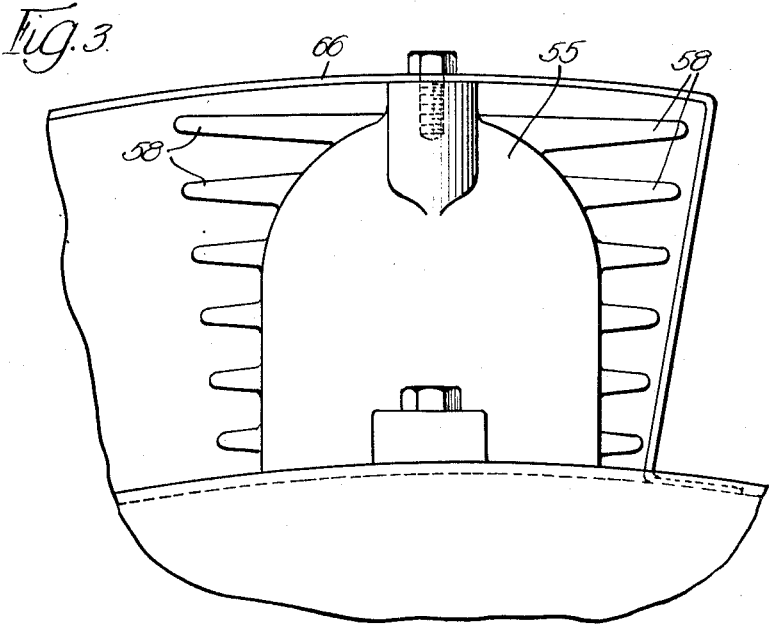
INVENTORS
Theodore J Ethier,
BY Joseph W. Putman,
Wilkinson, Huxley, Byron + Hume
Attys United States Patent Office 2,787,720
Patented Apr. 2, 1957

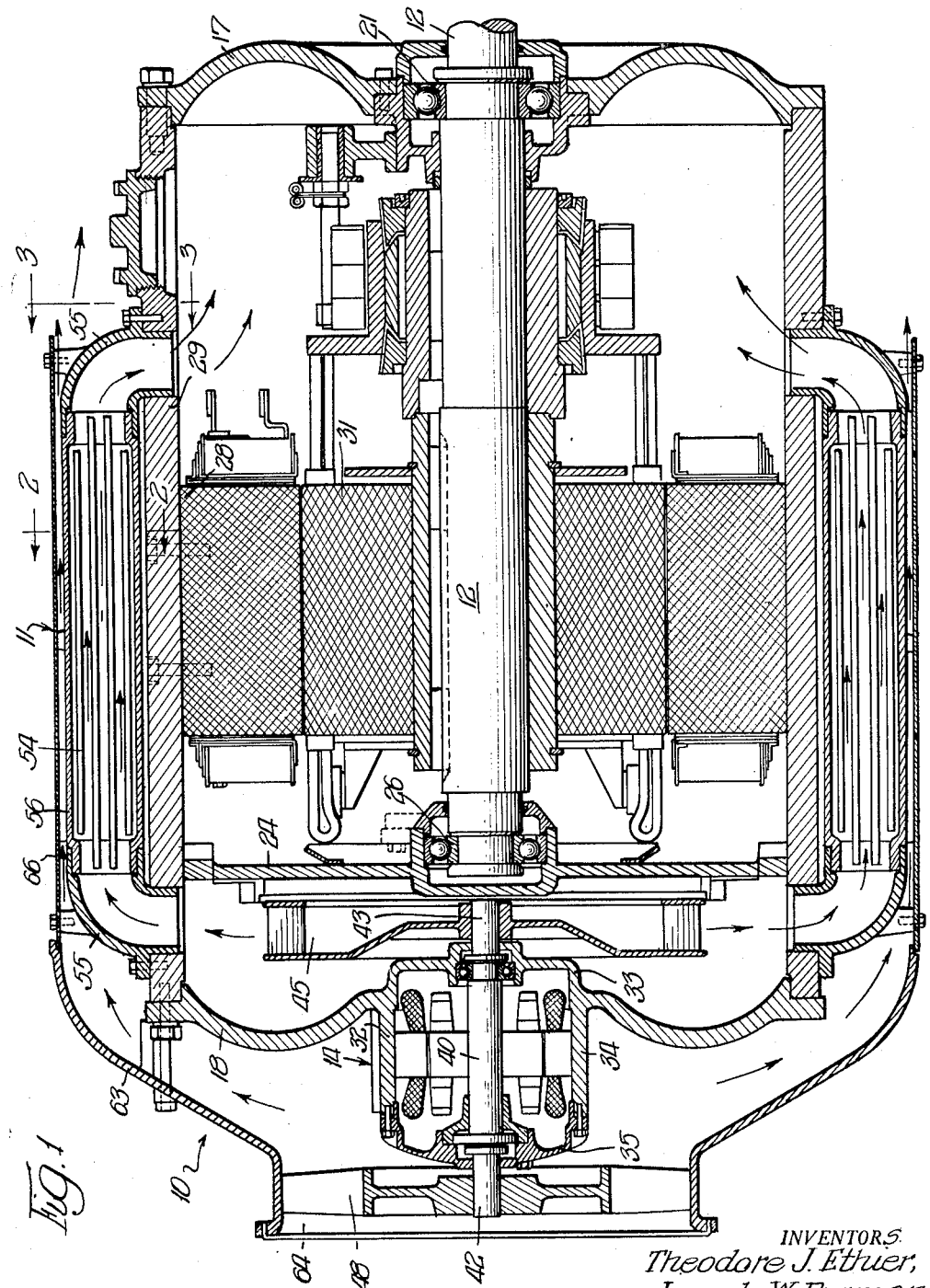

2,787,720
COOLING OF ELECTRIC MACHINES

Theodore J. Ethier, Waukesha, and Joseph W. Purman, Milwaukee, Wis., assignors to The Louis Allis Co., Milwaukee, Wis., a corporation of Wisconsin Application April 26, 1955, Serial No. 503,868

1 Claim. (Cl. 310—57)

This invention relates to the cooling of electric machines, and more particularly to ventilating systems for machines that are totally enclosed in a casing.

Electric machines that are designed to be used in dust-ladened, explosive, or corrosive environments are ordinarily provided with fully enclosed housings. In order to prevent undue heating of such fully enclosed machines, many attempts have been made for cooling by blowing cold air on the outside of the housing by means of fans, or by circulating the internal hot air. The first-mentioned attempts have only been partly successful owing to the insufficient area of radiating surface of the housing and inadequate heat exchange between the hot internal air and the cold outside air. Circulating the hot internal air has been tried by mounting fan blades on the shaft of the main motor, but this is not entirely satisfactory in large machines in which the rotation of the power take-off shaft is relatively slow.

It is, therefore, an object of this invention to provide a cooling system for a totally enclosed electric machine.

It is a further object of the invention to provide means for circulating the hot internal air in an electric machine, and for cooling the thus circulated internal air.

Further objects and advantages of this invention will become evident as the description proceeds and from an examination of the accompanying drawing which illustrates one embodiment of the invention and in which similar numerals refer to similar parts throughout the several views.

In the drawings:

Figure 1 is a longitudinal sectional view of an electric machine embodying the invention.

Figure 2 is an enlarged fragmentary section taken along line 2—2 in Figure 1.

Figure 3 is an enlarged fragmentary section taken along line 3—3 of Figure 1.

The electric machine 10 comprises a main motor 11 having a power take-off shaft 12 and a separate auxiliary motor 14, physically attached to one end of the main motor for driving the ventilating fans in the cooling system.

The main motor 11 is the usual three-part assembly, including a stator frame and end bells 17, 18 secured at each end thereof forming a totally enclosed housing for the main motor. End bell 17 carries a bearing 21 on which is journaled shaft 12. The other end of the main motor shaft is supported within the main motor by support pieces 24 and bearing 26 spaced from end bell 18.

The stator 28 for the main motor is fastened to a frame 29 and the rotor 31 is mounted on shaft 12.

The separate auxiliary motor 14 is mounted in a housing 32 integral with end bell 18 of the main motor. End bell 18 has recessed portion 33 and an outwardly projecting cylinder wall 34, which together with the end bell 35, form the housing for the auxiliary motor. A shaft 40 for the auxiliary motor is journaled on bearing 41 in end bell 18 of the main motor and on end bell 35 of the auxiliary motor. One extremity 42 of the auxiliary motor shaft 40 projects outside end bell 35 and the other extremity 43 of the auxiliary motor shaft projects through main motor end bell 18 into the main motor housing.

Fans 45 are mounted on shaft 40 internal of the main motor housing for circulating the hot air within the main motor housing. At the other extremity 42 of the auxiliary motor shaft are mounted fans 48 for directing cold air along the housing of the main motor for cooling the internal air. The fans 48 are intake fans which draw the cold outside air into casing 63, and force such outside air through channels 66 for cooling the hot internal air.

The main motor housing is provided with channels 54 for conducting the hot air of the main motor beyond the stator or field windings, and for this purpose are mounted so as to communicate with the inside fan 45. The channels 54 are constructed from elbows 55 fastened to the stator frame and straight sections 56 mounted between such elbows. As more particularly shown in Figures 2 and 3, channels 54 have inner radiating fins 57 and outer radiating fins 58 for efficient heat exchange between channels 54 and 66.

A casing 63 fastened to the frame encloses the outside fans 48. An intake opening 64 is provided in the casing 63 adjacent the intake fan 49. The casing 63 is shaped to form channels that conduct the outside air adjacent the housing and into heat exchange relation with the channels 54. Outer ducts 66 are mounted to conduct the outside air from casing 63 along the channels 54 for cooling the same.

From the foregoing, the operation of the cooling system for electric machines should be apparent. The fans 45 circulate the hot internal air of the main motor in a fully enclosed housing. The hot circulated air is conducted by channels 54 beyond the stator or field windings of the main motor into heat exchange relation with channels 66. The fans 45 are driven by an auxiliary motor that has a relatively higher rotational speed than the main motor. The cold outside air is forced by fans 48 along the surface of the housing through channels 66 into heat exchange relation with channels 54.

In the drawing and specification, there have been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention, as further defined in the following claim.

We claim:

In an electric machine, a main motor having field windings, a fully enclosed housing for said motor including an end bell, an auxiliary motor having a housing integral with said end bell, a rotatable shaft for said auxiliary motor extending into said main motor housing, inside fan means mounted internally of the main motor housing at one end of said shaft for circulating the hot air inside said main motor housing, outside fan means mounted at the opposite end of said shaft externally of the auxiliary motor housing, first channel means communicating with said outside fan means for circulating cold air along the surface of said housing, and second channel means communicating with said inside fan means for circulating the hot air of the main motor housing beyond said field windings into heat exchange relation with said first channel means.

References Cited in the file of this patent

UNITED STATES PATENTS 2,717,320   Shoulders _____ Sept. 6, 1955

FOREIGN PATENTS 491,260   Great Britain _____ Aug. 30, 1938